UNITED STATES PATENT OFFICE.

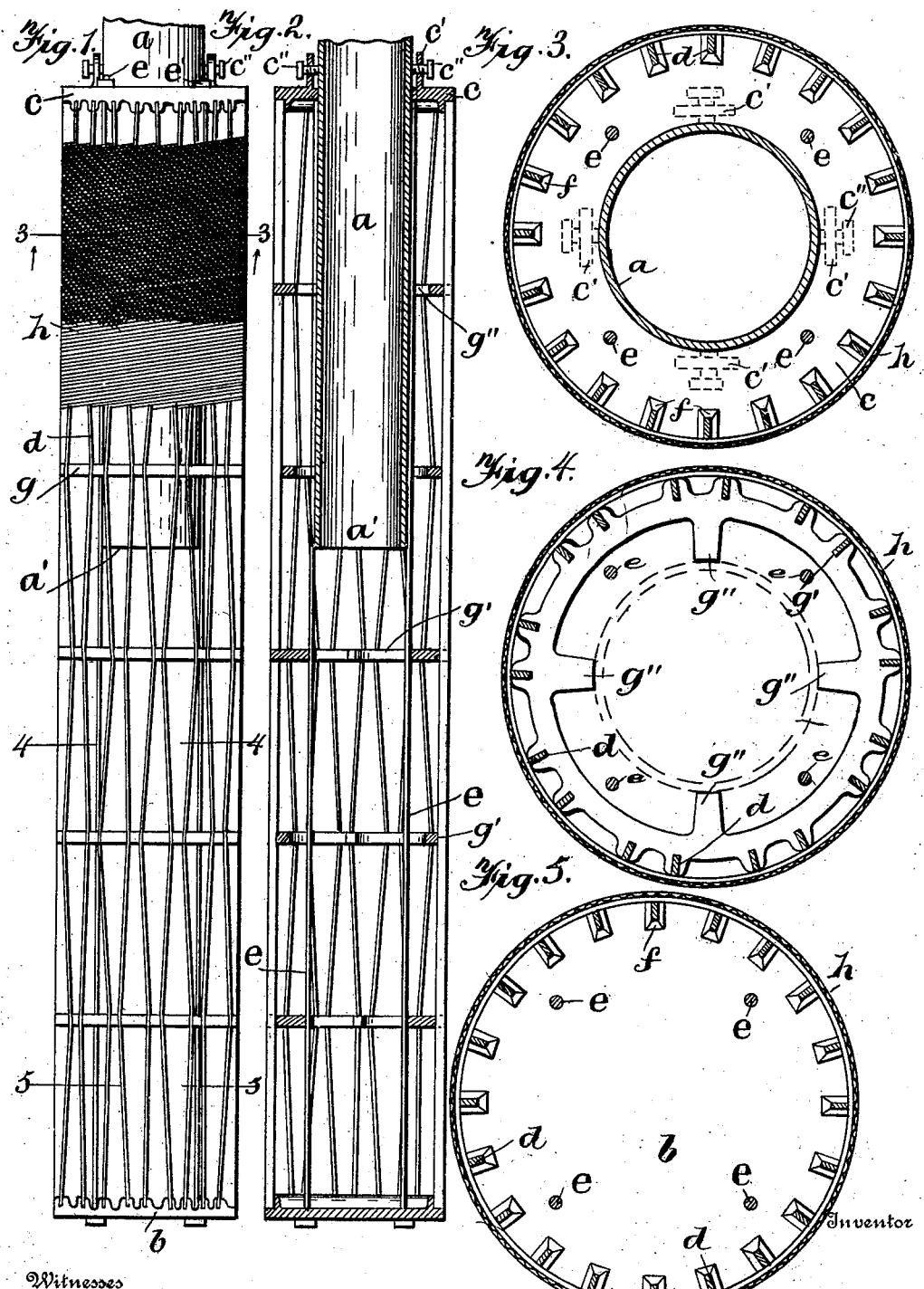

CONRAD LINDSTROM, OF ELCAMPO, TEXAS.

CASING-POINT.

SPECIFICATION forming part of Letters Patent No. 715,676, dated December 9, 1902.

Application filed December 26, 1901. Serial No. 87,289. (No model.)

*To all whom it may concern:*

Be it known that I, CONRAD LINDSTROM, a citizen of the United States, residing at Elcampo, Wharton county, State of Texas, have invented certain new and useful Improvements in Casing-Points; and I do hereby declare the following to be a full, clear, and exact description of the invention, such as will enable others skilled in the art to which it appertains to make and use the same.

This invenvion relates to certain improvements in well or casing points, and relates more particularly to an improved strainer or screen frame for wells; and the objects and nature of my invention will be readily understood by those skilled in the art in the light of the following explanation of the construction shown in the accompanying drawings merely as an example of one form and arrangement from among others within the spirit and scope of my invention.

My invention consists in certain novel features in construction and in combinations and in arrangements of parts and details, as more fully and particularly pointed out and specified hereinafter.

Referring to the accompanying drawings, Figure 1 is a side elevation of my strainer-frame applied to an uptake or suction pipe or casing, the pipe being broken away and a strainer-covering around the framework being shown partially broken away. Fig. 2 is a longitudinal sectional view of the showing in Fig. 1. Fig. 3 is a cross-section on the line 3 3, Fig. 1, looking in the direction of the arrow. Fig. 4 is a cross-section on the line 4 4, Fig. 1. Fig. 5 is a cross-section on the line 5 5, Fig. 1.

In the drawings, $a$ is the uptake or suction pipe or casing having the bottom inlet or open lower end $a'$.

The invention comprises a novel construction and arrangement of open framework constituting the strainer or screen when wrapped with the necessary strainer-covering. This frame is arranged longitudinally of the casing and extends to a point below the same and comprises longitudinally-disposed bars arranged around the casing and forming the circumferential portion of the framework.

$b$ is the lower head or bottom plate of the casing-point or screen, and $c$ is the corresponding or opposing upper head or top plate thereof.

$d$ represents the bars extending longitudinally of the casing and throughout the length of said casing-point or screen and arranged around the same and at their ends abutting against and secured between the two end heads or plates $b\ c$. The two end heads are rigidly secured in any suitable manner, usually by being secured together. For instance, bolts or tie-rods $e$ can be employed for this purpose, passing throughout the length of the casing-point and within the circle of bars $d$ and having their threaded ends passing through the end heads or plates and provided with nuts $e'$, engaging the outer faces of said end heads, so that said heads can be drawn toward each other to tighten the casing-point frame and rigidly bind and lock the parts thereof together. The inner faces of the end heads $b\ c$ are provided with sockets or seats $f$, equally spaced and arranged in a series around the same near the periphery thereof. The ends of the bars $d$ are stepped or seated in these seats or sockets on the end heads and can be locked therein by tightening up the nuts on the bolts or tie-rods, locking the end heads together. If desired, the bars can be secured to the end heads in any suitable manner and by any suitable means. For instance, in the drawings each said seat or socket is shown formed by a pair of raised lips or ears, and it is obvious that the bar ends can be inserted between these ears and, if so desired, secured, as by pressing or forcing the ears against the bar.

$g$ represents intermediate supports or spacing devices for the bars, arranged within the circle of bars and usually at intervals throughout the length of the framework. These intermediate supports are parallel with the end heads and are usually skeleton in form, with open centers in the particular example shown, each support being a ring or annulus with transverse slots $g'$ arranged around its periphery and receiving the longitudinal bars. Each slot $g'$ can be formed by a pair of lugs or ears projecting radially from the outer edge of the ring and receiving a bar edgewise between them, so that the bar can be locked or clamped, pressing or forcing the ears against the bar. I usually prefer not to have the slots $g'$ equally spaced, but to have them irregularly spaced. For instance, alternate spaces between the slots can be of the same width and greater or less than the intervening spaces. As before stated, the seats in the end heads can be equally spaced, so that the bars will be at intermediate portions slightly deflected laterally to enter said slots $g'$, which are spaced differently from the seats of the end heads. This difference in spacing is designed to enable the longitudinal bars to hold the intermediate supports properly in place and also to hold the longitudinal bars against twisting or buckling when the tie-rods or bolts are tightened up. The intermediate supports can be provided with the inwardly and radially projecting fingers or stops $g''$, designed to abut against the exterior of the pipe or casing $a$, and thereby aid in holding the frame and pipe in proper relation to each other and permitting the pipe to extend throughout the entire length of the frame, if desired. The top plate or head is centrally perforated to receive the pipe or casing and is formed with several lugs or ears $c'$, having screw-threaded openings therethrough receiving radially-arranged set or clamping screws $c''$. These screws can be tightened up to abut at their inner ends tightly against the pipe or casing, and thereby rigidly clamp the screen or casing-point to the pipe. Also by this means the casing-point can be adjusted longitudinally of the pipe, so that the pipe can extend any desired distance into the screen or casing-point.

$h$ is the strainer or screen covering or jacket, which is wrapped around the exterior of the framework or series of bars throughout the length thereof. This strainer-covering can be formed by any suitable material—such, for instance, as a spiral wrapping of wire the convolutions of which are close enough to keep out sand and gravel and yet permit free passage of water or liquid therethrough. Also wire cloth or netting can be employed. By thus forming the casing-point or screen as an elongated cylinder having greater diameter than the casing and longitudinally open the suction-pipe does not need to be cut to any exact length or measurement; but the screen-point can be easily adjusted longitudinally of the pipe with the pipe projecting any distance into the said point.

This device is particularly intended for use in wells, usually irrigating-wells, in sandy soil, and the casing with the screen-point attached is inserted in the well, and the screen-point will maintain a comparatively large body of water free from sand and gravel at the inlet end of the suction-pipe. As these screen-points are comparatively long, sometimes fifteen feet, more or less, and of a comparatively large diameter, sometimes sixteen inches, where the suction-pipe is eight in diameter, the water is drained from an extensive area and collected free of sand ready for rapid discharge through the suction-pipe.

These screen-points can be comparatively easily manufactured at a low cost and are very strong and durable.

It is evident that various changes and modifications might be resorted to in the forms, constructions, and arrangements of the parts described without departing from the spirit and scope of my invention. Hence I do not wish to limit myself to the exact construction set up.

Having thus fully described my invention, what I claim as new, and desire to secure by Letters Patent of the United States, is—

1. A casing-screen comprising a series of longitudinal bars, securing means therefor, intermediate spacing skeleton members within the series of bars, and having edge slots receiving the bars individually, the slots being differently spaced in adjacent members, and an exterior strainer-covering, substantially as described.

2. A casing having an inlet end, in combination with an elongated casing-screen arranged longitudinally of the casing and comprising a series of longitudinal bars, an exterior strainer-covering around said bars, means securing said bars, and an intermediate spacing-ring within the bars and having inwardly-projecting portions abutting against said casing, and provided with edge slots individually receiving said bars, substantially as described.

3. A pipe or casing having an inlet, in combination with a screen-point comprising end heads, means connecting said heads, the upper head having a transverse opening receiving said pipe and portions provided with set-screws adjustably clamping said pipe, the series of longitudinal bars at their ends fitting said heads, intermediate spacing and supporting skeletons within the series of bars and fitted thereto, and an exterior strainer-jacket around the bars, substantially as described.

4. A pipe or casing having an inlet end, in combination with an elongated screen-point arranged longitudinally of said pipe and comprising a series of longitudinal bars, an exterior strainer-jacket around said bars, and an intermediate supporting or spacing ring within the bars and having separate inwardly-projecting radial portions abutting against the exterior of the pipe; the ring at its peripheral portion individually receiving said bars, substantially as described.

5. A pipe or casing having an inlet end, in combination with an elongated screen-point arranged longitudinally of said pipe and comprising a series of longitudinal bars, an exterior strainer-jacket around said bars, and a series of intermediate supporting or spacing rings within the bars and having inwardly-projecting portions abutting against the exterior of the pipe, and thereby permitting the pipe to be adjusted longitudinally within the screen; said rings individually receiving said bars.

6. In combination, a casing having the lower inlet end, and a screen-point arranged longitudinally of said casing and of greater diameter than the same and extending from a point above to a point below said end, thereby forming the water-space around the casing and below the open end thereof, said point adjustable longitudinally of said casing and comprising end heads, means securing said heads together, and series of longitudinal bars secured between said heads and surrounded by an exterior strainer-jacket, substantially as described.

7. In combination, a pipe or casing having an inlet, and a screen-point arranged longitudinally of the casing and comprising end heads, one of said heads having an opening receiving said casing, a series of longitudinal bars extending between the heads and at their ends fitted therein, means adjustably securing said end head to the casing, and an exterior strainer-jacket around the series of bars, substantially as described.

8. In combination, a pipe or casing having a lower inlet end, and a screen-point of greater diameter than the casing and arranged longitudinally thereof and comprising two end heads, one having an opening for the passage of the pipe, a series of longitudinal bars arranged between said heads, rods connecting the heads and drawing the same against said bars, and an exterior strainer-jacket around the series of bars, substantially as described.

9. A screen-point or strainer, comprising end heads, longitudinal bars extending between the heads and forming an approximately cylindrical open framework, intermediate spacing devices within the series of bars and fitted thereto and holding intermediate portions of the bars bent or deflected laterally in opposite directions, and a strainer-covering around the series of bars, substantially as described.

In testimony whereof I affix my signature in presence of two witnesses.

CONRAD LINDSTROM.

Witnesses:
MEL. W. ELSON,
GEORGE W. JACKSON.